G. ANDERSON.
SAW FITTING DEVICE.
APPLICATION FILED MAY 2, 1916.
1,290,038.
Patented Jan. 7, 1919.
2 SHEETS—SHEET 2.
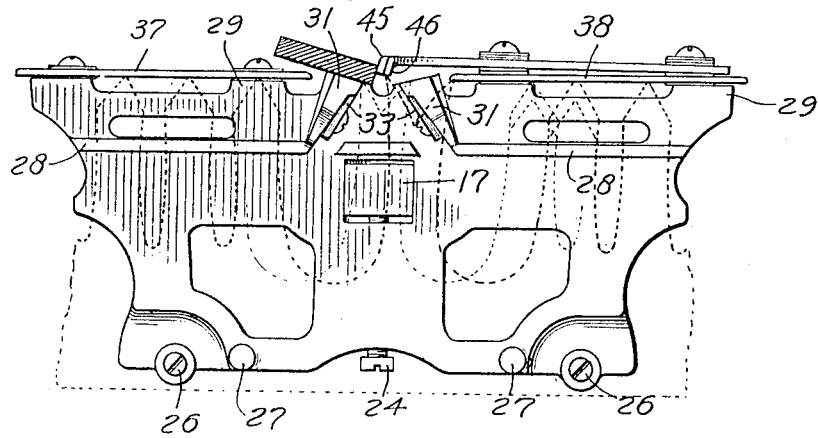
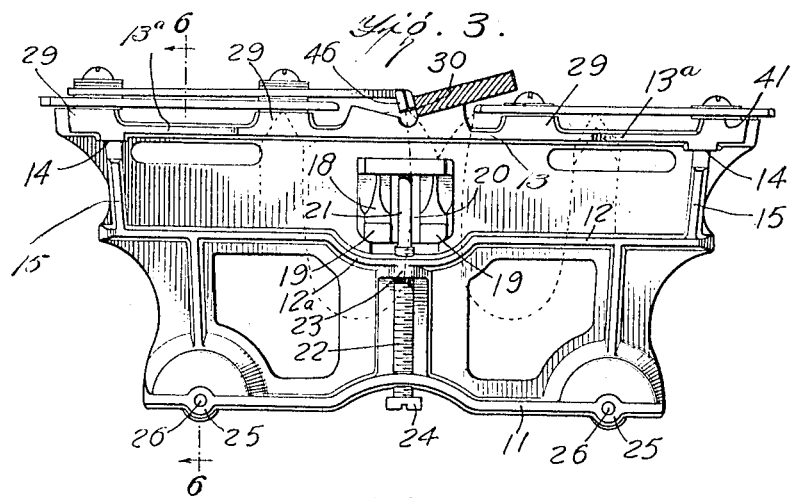
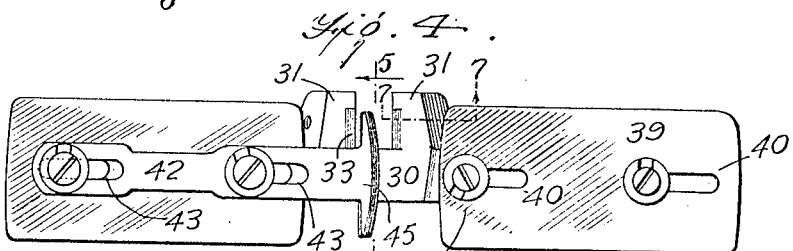
WITNESSES:
INVENTOR
GUSTAF ANDERSON,
BY
ATTORNEYS

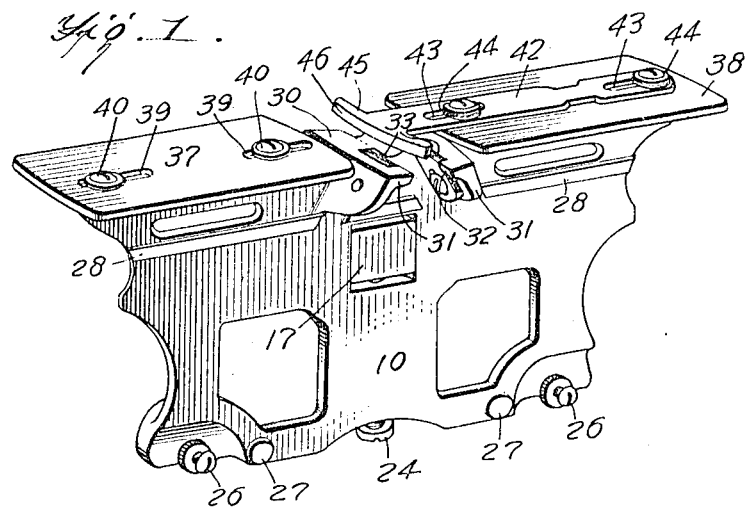
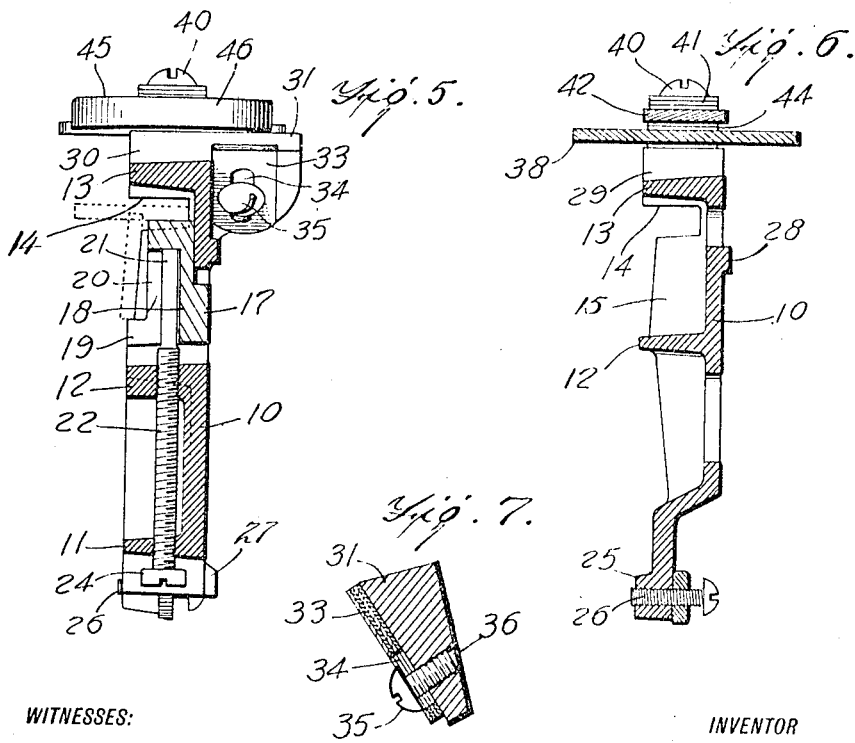

UNITED STATES PATENT OFFICE.

GUSTAF ANDERSON, OF ATLIN, BRITISH COLUMBIA, CANADA.

SAW-FITTING DEVICE.

1,290,038.  Specification of Letters Patent.  Patented Jan. 7, 1919.

Application filed May 2, 1916. Serial No. 94,920.

*To all whom it may concern:*

Be it known that I, GUSTAF ANDERSON, a citizen of the United States, and a resident of Atlin, in the Province of British Columbia and Dominion of Canada, have invented a certain new and useful Improvement in Saw-Fitting Devices, of which the following is a specification.

My present invention relates generally to saw fitting devices, and more particularly to devices for fitting up cross-cut saws.

In the use of cross-cut saws it is well known that the raker teeth of the saw should always be slightly shorter than the cutting teeth, and that, for the saw to be most efficient, this difference must necessarily vary according to the different hardness of different kinds of timber, a felling saw usually requiring longer raker teeth than a saw used for cutting up the trees after they have been felled, and that in localities where the timber is of large growth, it is preferable that the two opposite points of the raker teeth should be of unequal length so as to cause the ends of the saw to be most active on their outward strokes. While these variations are slight, they are important, and it is most desirable for this reason that, when the raker teeth filing gage has once been adjusted to suit specific purposes, the operator should be enabled to shift the gage from one preadjusted position to another with rapidity and exactness, which cannot be done at present, particularly with the gages now used having their filing gage surface integral with the body thereof.

The primary object of the present improvement is, therefore, to provide a device of the above character, which will be simple and inexpensive, and which will increase the efficiency and extend the utility of the several parts thereof.

A further object is to provide means for a series of predetermined, unvarying, and rapidly interchangeable adjustments of the raker teeth filing gage, for producing desirable lengths of raker teeth of different saws, and to provide the frame of the device with an integral filing gage surface in combination with vertically adjustable anti-friction cap plates for increasing efficiency, rigidity, and simplicity.

A further object is to provide the integral filing gage surface with means for producing an unvarying clearance bevel and a true transverse clearing edge on the points of the raker teeth of saws.

Further objects are to provide anti-friction cap plates that overhang both sides of the frame for the support on the cutting teeth of two swaging guides, in combination with a raker tooth filing gage on one side and a saw jointer and side file on the other side of the device; to provide longitudinally movable cap plates to follow each other relative to the shifting of the tooth stop so as to be out of the way for the transverse operation of the file on and toward the center of the device, with a beveled or inclined filing surface.

Still further objects are to provide an anti-friction reversible and vertically and longitudinally adjustable file guide and swaging guide member adapted to be operated in the forks of the raker teeth for guiding the file over the tooth stop, and for preventing the lower side edge of the file from coming in contact with the shank of the raker tooth point opposite to that being operated upon, and to further minimize friction between the cap plates and the tooth points and prevent injury to the latter.

A still further object is to provide a file clamping slide adapted to hold the file both edgewise and flatwise in the upper part of the device in combination with continuous or unbroken longitudinal bearing flanges.

These and other objects, together with the advantages resulting therefrom, will be apparent from the following description, reference being made to the accompanying drawings forming a part of this specification, and in which—

Figure 1 is a perspective view of my improvements.

Fig. 2 is a side view looking at the side seen in Fig. 1.

Fig. 3 is a side view looking at the opposite side.

Fig. 4 is a top plan view.

Fig. 5 is a central cross section taken substantially on line 5—5 of Fig. 4.

Fig. 6 is a vertical cross section taken substantially on line 6—6 of Fig. 3, and Fig. 7 is a detail section taken substantially on line 7—7 of Fig. 4.

Referring now to these figures, and particularly to Fig. 3, the jointer side of the body or web 10, which latter may be formed of cast or other metal, has continuous longitudinal flanges 11 and 12 projecting therefrom and spaced the proper distance apart to form a saw bearing plane. Another similar flange 13, substantially parallel with, and spaced from the flanges 11 and 12, is located near the top edge at the jointer side of the body 10, the central portion of which flange 13 projects outward flush with the saw bearing plane formed by the flanges 11 and 12, and the end portions of which are cut away slightly as shown at 13ª in Fig. 3 to allow for the set in the cutting teeth of the saw.
This flange 13 operates, therefore, to further steady the body 10 against the sides of a saw, for the operation as a raker teeth swaging guide to be hereinafter described.

Near the ends and on the under surface, of the flange 13, are located slightly depending file rests 14, the lower faces of which are at right angles to the saw bearing plane, and spaced beneath these file rests are the upper ends of vertical ribs 15, slightly inclined in an upward and inward direction, for the reception thereagainst of the flat side of a file, the spaces between the upper ends of these ribs and the file rest 14 admitting the edge of a file.

Centrally of its ends and above the centrally depressed portion 12ª of flange 12, the body 10 is provided with a rectangular opening 16 in which is vertically movable the lateral body extension 17 of a file clamping slide 18, the latter being adjustable upon the jointer side of the body 10 and having lower laterally projecting seats 19, the slide being movable downwardly into the centrally depressed portion 12ª of flange 12, so that in its lowermost position the upper faces of the seats 19 are flush with the said flange. The upper end of this slide engages a file disposed edgewise against the file rest 14, and the seats 19 engage the lower edge of a file disposed flatwise against the ribs 15.

The slide 18 is further provided with a vertical groove 20 in which extends the upper portion 21 of an adjusting screw 22, the upper end of which engages the top of the slide, this adjusting screw being threaded through a bearing 23 centrally of the depressed portion 12ª of flange 12 and having its lower headed end 24 projecting exteriorly through an opening centrally of the flange 11.
Through bearings 25 adjacent the outer ends of the lower flange 11, are threaded adjusting screws 26, adapted to bear more or less against the saw blade below its teeth, for shifting the angle of a file held in the upper portion of the device as before described, relative to the set of the saw teeth.

It is to be here noted that by virtue of the particular disposition and adjustment of the slide 18 as described, I am enabled to continue the flanges 11 and 12 in unbroken relation from end to end of the device, so as to strengthen the body 10 and render it less liable to warping while cooling after being cast.

The opposite side of the body 10, which may be called the raker gage side, has small laterally projecting bearing points 27 adjacent its lower edge, as plainly seen in Figs. 1 and 2, and laterally projecting longitudinally extending ledges 28 above its center, which, together with the said bearing points 27, form the saw bearing plane at the respective side of the body.

The upper edge of the body 10 and flange 13 are, at opposite sides of the center of the body, provided with upwardly projecting bosses 29, between the inner ones of which is a transverse raker filing gage surface 30 having inclined portions at opposite sides of its center to produce a permanently fixed and unvarying clearance bevel on the points of the raker teeth. Each inclined portion, as just mentioned, of the filing gage surface 30, is provided with a lateral extension 31 for guiding the file used, to produce a true transverse clearing edge on the points of the raker teeth, these extensions projecting from one face of the body 10 with inner downwardly and outwardly inclined faces. The inner edge of each of the extensions 31 inclined as before mentioned, is provided with a lip 32 engaging the outer edges of a series of adjustable tooth stop plates 33, each of which plates has a longitudinal slot 34 to provide for the reception of an adjusting screw 35 extending through the series and threaded into an opening 36 in the particular extension 31, as most plainly seen by reference to Fig. 7.

Thus, as each of these tooth stop plates 33 will, when its upper edge is brought even with the filing surface, shift the point of contact with the raker teeth longitudinally of the device, a very fine and unvarying adjustment is produced by the plates, by means of which raker teeth of desired length may be produced as the filer may desire or require.

It is obvious, therefore, that while two oppositely inclined surfaces, as shown and described, are not essential, they may be of considerable advantage as they may be of slightly different height to produce a more varied adjustment.

Mounted along the upper edges of the body 10 and flange 13, are cap plates 37 and 38, each of which it will be noted, overhangs both sides of the body 10 and is provided with longitudinally slotted openings 39 by which it is adjustably secured by clamping screws 40 extending through these openings and threaded into the upwardly projecting bosses 29 before described. These cap plates may be vertically adjusted by the interposition of one or more washers 41 between the same and the bosses 29, and for this purpose it is preferable that a number of such washers be carried in reserve. Thus, by virtue of the fact that the top plates overhang both sides of the body 10, the desired operations upon the saw at each side of the body are permitted.

By reason of the filing gage surfaces being inclined and the shifting of the tooth stop plates 33 in connection therewith, the cap plates 37 and 38 are longitudinally adjustable through the means before described, in order to obviate interference with the sidewise tilt of the file in operation.

For guiding the file in the transverse filing operation on the extensions of the filing surfaces, and for preventing the lower side edges of the file used, coming in contact with the shank of the tooth point opposite to that which is being operated upon by the file, and for the further purpose of minimizing friction between the points of the cutting teeth and the cap plate, I provide a combined file guide and swaging guide 42 adaptable to either or both of the cap plates 37 and 38 and having a laterally extended head or inner end movable between the forks of a raker tooth. This member, as best seen in Figs. 1 and 4, is generally T-shaped and its body is provided with longitudinally slotted openings 43 through which the clamping screws 40 of the particular cap plate in connection with which it is mounted, are extended, thus providing for longitudinal as well as vertical adjustment, in the latter of which one or more of the washers 44 are interposed between the body of member 42 and the upper surface of the cap plate.

The inner headed end 45 of this member has a slightly curved and case hardened bearing surface for engagement by the lower side edge of the file held as shown in Figs. 2 and 3, and is for this purpose provided with a depending flange 46 as plainly seen in Figs. 2 and 3, the lower surface of which flange at the opposite ends thereof, form swaging guides at opposite sides of the body 10. Both the flange 46 and the curvature and the case hardening of the head 45 provide a file engaging surface which will minimize friction and facilitate movement and adjustment of a file in use.

Thus, by virtue of the fact that these swaging guides formed by the opposite ends of the flange 46, point transversely and outwardly into open spaces beyond opposite sides of the body 10, both points of the raker teeth are visible from an operator's viewpoint, and can therefore be most conveniently utilized as swaging guides as well as a file guide.

In the operation of the device as thus described, for jointing and side dressing the points of the cutting teeth of the saw, the file is placed in position as before described and clamped by the clamping slide 19. The angle of the file may be adjusted by means of the adjusting screws 26, which, as before stated, engage the side of the saw blade below its teeth.

The raker filing gage surface 30 may be vertically adjusted by elevating the cap plates 37 and 38 and interposing washers 41 as before described, which adjustment should be made for that kind of timber which requires very long raker teeth, and may remain comparatively permanent. As between one kind of timber and another, the adjustment may be made by bringing one or more of the tooth stop plates 33 up even with the filing gage surface 30, as before described.

The combined file guide and swaging guide 42 may then be adjusted to fit in between the two points of the raker teeth, and at an elevation so as to leave its swaging guide surfaces at the ends of flange 46 a short distance below the line of the under surface of cap plates 37 and 38. Vertical adjustment of this member 42 may be accomplished by interposing one or more washers 44 between the same and the adjacent cap plate, attention being again called to the fact that the said member may be utilized in connection with either or both of the cap plates. The filer may then proceed with the swaging of the raker teeth by repeatedly striking the same with a hammer and swaging the same against the inclined surface 30, the gage to be presently described being utilized in this operation.

A proper clearance, bevel, and uniform length may then be given to the points of the raker teeth by placing the device properly on the saw and filing off the points of the raker teeth even with the filing gage surface 30.

In using the implement seen in Fig. 2, it is placed upon a saw to receive the raker teeth successively between the gage extensions 31 in such manner that, by shifting the implement longitudinally on the saw, the toothed points may each be removed from the respective gage extension of the gage head 45 and vice versa, as readily seen by reference to the dotted lines of Fig. 2, wherein the saw is indicated in connection with a swaging guide by heavy dots and with the filing gage by light dots.

It is of course to be appreciated that the swaging guide does not serve as a gage by which to gage the teeth to a certain height or length. It merely serves as a guide by which the filer may ascertain whether a tooth point is long enough to be given the proper curve. The gaging is being done by the filing gage simultaneously with the sharpening operation. A stroke or two with the file gages the length and sharpens the tooth and produces a proper clearance bevel and a transversely true clearing edge on the tooth points, such as could not be obtained by a swage gaging operation.

It will be understood that if the raker teeth points be filed or swaged transversely slantwise, the saw would not run true, but would run to one side. The operation of my device prevents this, and every raker tooth point is filed alike and at the exact length desired.

The member 42 as a file guide provides a smooth transverse passage for the file so as to prevent vibration of the saw and thereby minimizes friction between the cap plates and the tooth points and injury to the latter. It also serves to guide the file over the filing surface extension.

It is to be noted, furthermore, that, while the filing surface extensions 31 are provided with raker teeth contact points and are adapted to carry the stop plates 33, they also serve as means for guiding the file transversely of the device on the opposite sides of the saw, so that the tips of the raker teeth will not be filed lower on one side of the saw than the other. Without such means the device would be practically useless.

If, by reason, of the character of the timber, the raker teeth should prove to be too long after test, their length may be quickly reduced by bringing to the filing surface, another one of the stop plates 33 and repeating the filing operation. This may be accomplished without injury to the cutting teeth even after they have been filed to a sharp point, by reason of the anti-friction material of which the cap plates 37 and 38 are formed.

It is obvious, therefore, that a wide range of adjustment is provided for and that, when the parts are once adjusted, the several operations may quickly follow to the desired end.

I claim:—

1. A device of the character described including a body having means for steadying the same against the teeth of a saw, file clamping means at one side thereof, cap plates overhanging the said clamping means, and swaging guides supported by the said cap plates.

2. A device of the character described including a body having an integral raker filing gage surface, and vertically adjustable cap plates at the upper portion thereof whereby to vary the elevation of said filing gage surface in respect to a saw held against said cap plates.

3. A device of the character described including a body having a centrally located integral raker filing gage surface, and vertically adjustable cap plates at the upper edge thereof and upon opposite sides of said filing gage surface, whereby to vary the elevation of the filing gage surface with respect to a saw held against the said cap plates.

4. A device of the character described including a body having a filing gage surface, extensions projecting laterally therefrom, and means adjustable on said extensions whereby to shift the point of contact of raker teeth therewith, longitudinally of the body.

5. A device of the character described including a body having a filing surface, and extensions projecting laterally therefrom, and a plurality of relatively adjustable stop plates carried by said extensions adjacent the point of contact of a saw tooth therewith.

6. A device of the character described including a body having a filing gage surface and extensions projecting laterally therefrom, means adjustable on said extensions whereby to shift the point of contact of raker teeth therewith, longitudinally of the body, and cap plates at the upper edge of the body and longitudinally adjustable thereon to follow the shifting of the tooth-engaging points.

7. A device of the character described including a body having saw bearing means at its opposite sides, cap plates overhanging said bearing means at the opposite sides, a raker tooth filing gage at one side of the body, and a jointer at the opposite side thereof.

8. A device of the character described including a body having a filing gage surface, cap plates at opposite sides of said filing surface, and a combined filing and swaging guide adjustable vertically and longitudinally on one of said cap plates, said guide having a laterally extended head overlying the said filing gage surface.

9. A device of the character described including a body having a filing gage surface, cap plates at opposite sides of said surface, and a combined filing and swaging guide engageable with either of said cap plates and adjustable vertically and longitudinally with respect thereto, said guide having a head at one end overlying the filing gage surface.

10. A device of the character described including a body having a filing gage surface, cap plates at opposite sides of said surface, and a combined filing and swaging guide adjustable vertically and longitudinally on one of said cap plates and having a laterally extended head overlying said filing gage surface and movable between the forks of a raker tooth and provided with a curved, flanged, file-engaging edge.

11. A device of the character described, including a body having a filing gage surface, cap plates at opposite sides of said surface, and a combined filing and swaging guide adjustable vertically and longitudinally on one of said cap plates and having a laterally extended head overlying said filing surface and movable between the forks of a raker tooth and provided with a curved, flanged, file-engaging edge, the ends of which head extend laterally of the filing gage surface whereby to form swaging gages.

12. A device of the character described including a body having a filing gage surface with oppositely inclined faces, cap plates at opposite sides of said surface, and a guiding member supported by the cap plates and shiftable from one cap plate to the other.

13. In a device of the character described, a combined file guide and swaging guide consisting of an adjustable plate having laterally projecting extensions at one end and provided at its said end with a convexly curved file guide surface of which the said extensions form a part, the said curved end having a flange depending therealong and also along said extensions, the under surface of which flange at the ends of the extensions, forms swaging guides.

14. A saw fitting device having a filing gage surface and a swaging guide, and provided with an unobstructed space between the same to permit of free movement of a saw tooth from the said filing gage surface to the said swaging guide and vice versa without lifting the device with respect to the saw.

15. A saw fitting device having an inclined filing gage surface, and a file positioning stop, and means to permit of shifting the said stop with respect to the filing gage surface to vary the position of the teeth in the plane of the saw with respect to said file guiding surface.

16. A saw fitting device having a filing gage, and a separate swaging guide spaced lengthwise of the device with respect to said gage, and provided with an unobstructed space between the same, to permit of sliding movement of the fitting on a saw to shift a saw tooth from the gage to the guide and vice versa without lifting the device.

17. A saw fitting device having a pair of longitudinally spaced elements, one in the form of a filing gage and the other in the form of a swaging guide, the space between these elements being unobstructed whereby to permit of free movement of a saw tooth from one element to the other, and one at least of which elements is adjustable to vary the distance between the elements.

18. A saw fitting device having a filing gage and a swaging guide, separated lengthwise of the device, and means for adjusting the relative position of said gage and guide vertically of the device, the spaces between the gage and guide being unobstructed, for the purpose described.

GUSTAF ANDERSON.

Signed in the presence of—
H. YOUNG.

Copies of this patent may be obtained for five cents each, by addressing the "Commissioner of Patents, Washington, D. C."